United States Patent [19]

Smith

[11] Patent Number: 4,474,498

[45] Date of Patent: Oct. 2, 1984

[54] MULTIPLE-PASS IMPINGEMENT HEATING AND COOLING DEVICE

[76] Inventor: Donald P. Smith, 4530 Woodfin Dr., Dallas, Tex. 75220

[21] Appl. No.: 386,283

[22] Filed: Jun. 8, 1982

Related U.S. Application Data

[60] Continuation-in-part of Ser. No. 341,640, Jan. 22, 1982, which is a continuation-in-part of Ser. No. 286,060, Jul. 22, 1981, Pat. No. 4,409,453, which is a continuation of Ser. No. 20,968, Mar. 16, 1979, abandoned, which is a division of Ser. No. 687,982, May 19, 1976, Pat. No. 4,154,861.

[51] Int. Cl.³ .......................... F27B 9/00; F27B 9/04; A23L 3/00; F27D 7/04
[52] U.S. Cl. .................................. 432/144; 99/443 C; 99/447; 432/152; 432/199
[58] Field of Search ............... 432/128, 144, 152, 199; 99/443 C, 447, 355

[56] References Cited

U.S. PATENT DOCUMENTS

| | | | |
|---|---|---|---|
| 2,783,720 | 3/1957 | Skarin et al. | 432/152 |
| 4,154,861 | 5/1979 | Smith | 99/443 C |
| 4,309,938 | 1/1982 | Harmon | 99/443 C |

Primary Examiner—John J. Camby
Attorney, Agent, or Firm—Gerald G. Crutsinger; John F. Booth; Monty L. Ross

[57] ABSTRACT

Apparatus adapted to deliver a temperature-controlled gas from a common plenum to at least two thermal treatment zones is provided. The subject apparatus is adapted to direct columnated jets of a temperature-controlled gas so as to impinge on at least one surface of food products passing through such zones, and is further adapted to convey food products through such zones in multiple passes in which the food products are subjected to different thermal energy transfer rates in at least two of such zones.

6 Claims, 4 Drawing Figures

MULTIPLE-PASS IMPINGEMENT HEATING AND COOLING DEVICE

CROSS-REFERENCE TO RELATED APPLICATION

This application is a continuation in part of copending application Ser. No. 06/341,640, filed Jan. 22, 1982, now pending, which is in turn a continuation in part of application Ser. No. 286,060, filed July 22, 1981, now issued as U.S. Pat. No. 4,409,453, both of which are incorporated by reference herein. The application which issued as U.S. Pat. No. 4,409,453 is a continuation of application Ser. No. 20,968, filed Mar. 16, 1979, now abandoned, which is in turn a divisional of application Ser. No. 687,982, filed May 19, 1976, now issued as U.S. Pat. No. 4,154,861.

TECHNICAL FIELD

This invention relates to an improved apparatus for efficiently transferring thermal energy either into or out of food products. One aspect of the invention relates to an apparatus comprising a multiple-pass conveyor means that is adapted to subject a food product to different thermal energy transfer rates within a single enclosure. A further aspect of the invention relates to an apparatus for thermally treating food products that comprises at least two thermal treatment zones, one being vertically disposed above the other within a single enclosure, adapted to supply a temperature-controlled gas from a single source at different thermal energy transfer rates to food products transported sequentially therethrough.

BACKGROUND OF THE INVENTION

The use of impingement heating and cooling devices in apparatus for thermally treating food products has previously been disclosed. Such devices employ columnated jets of a temperature-controlled gas which impinge against the surface of a food product moving relative thereto. These devices are disclosed, for example, in U.S. Pat. Nos. 3,884,213; 4,154,861; and 4,289,792. In addition to the foregoing patents that have already issued to the present inventor, such apparatus is further disclosed in copending application Ser. No. 286,060, filed July 22, 1981.

More recently, an improved apparatus and method for rapidly heating and/or cooling food products and for substantially equilibrating the temperature throughout such food products was disclosed in application Ser. No. 06/341,640, filed Jan. 22, 1982. Notwithstanding the considerable advantages of the apparatus and methods previously disclosed, however, there remains a need for a compact and efficient apparatus that is able to deliver a temperature-controlled gas to at least one surface of a food product at different thermal energy transfer rates within a single cabinet or enclosure.

SUMMARY OF THE INVENTION

According to the present invention, an impingement heating/cooling apparatus is provided that is adapted to deliver a temperature-controlled gas through a common plenum to a plurality of thermal treatment zones within a single cabinet or enclosure so as to subject a food product moving sequentially therethrough to different thermal energy transfer rates.

According to one object of the invention, an apparatus is provided that comprises a multiple-pass conveyor means for transporting a food product through a plurality of thermal treatment zones within a single thermal treatment apparatus.

According to another object of the invention, an apparatus is provided that utilizes a plurality of ducts or jet fingers to deliver a temperature-controlled gas from a common plenum to at least two thermal treatment zones through which food products are sequentially transported. The ducts are preferably adapted to cause columnated jets of the temperature-controlled gas to impinge on at least one surface of the food products, and to cooperate with a multiple-pass conveyor to provide different thermal energy transfer rates within each thermal treatment section.

According to another object of the invention, a plenum is provided that is adapted to permit a temperature-controlled gas discharged from ducts or jet fingers in fluid communication with the plenum to be directed back to the intake side of the impeller utilized to force the temperature-controlled gas through the plenum.

According to another object of the invention, a device for the controlled heating or cooling of food products is provided that comprises at least two thermal treatment zones wherein a temperature-controlled gas is delivered to each of such zones at substantially the same temperature, but is caused to impinge upon the surface of a food product passing sequentially therethrough at different thermal energy transfer rates.

According to another object of the invention, an impingement heating/cooling device is provided that comprises a multiple-pass conveyor adapted to transport a food product through such device in a different direction and at a different rate of speed on one pass than on a subsequent pass.

According to yet another object of the invention, an apparatus for thermally treating food products is provided that comprises a conveyor adapted to transport a food product through a plurality of thermal treatment zones within a single cabinet or enclosure; a plurality of ducts or jet fingers for directing columnated jets of a temperature-controlled gas so as to impinge on the surface of the food product passing through the thermal treatment zones; means for separately controlling the rate of thermal energy transfer to a food product as it passes through such thermal treatment zones; and a unitary plenum in fluid communication with the ducts or jet fingers supplying the temperature controlled gas to at least two of such zones that is adapted to deliver the temperature-controlled gas from an impeller to the ducts, and thereafter permit the return of the gas discharged from the ducts to the intake side of the impeller.

These and other objects of the invention are discussed in further detail below.

BRIEF DESCRIPTION OF THE DRAWINGS

The subject invention, together with further objects and advantages thereof, may best be understood by reference to the following description taken in connection with the accompanying drawings in which.

Numeral references are employed to designate like parts throughout the various figures of the drawing.

DESCRIPTION OF A PREFERRED EMBODIMENT

Figure 1:
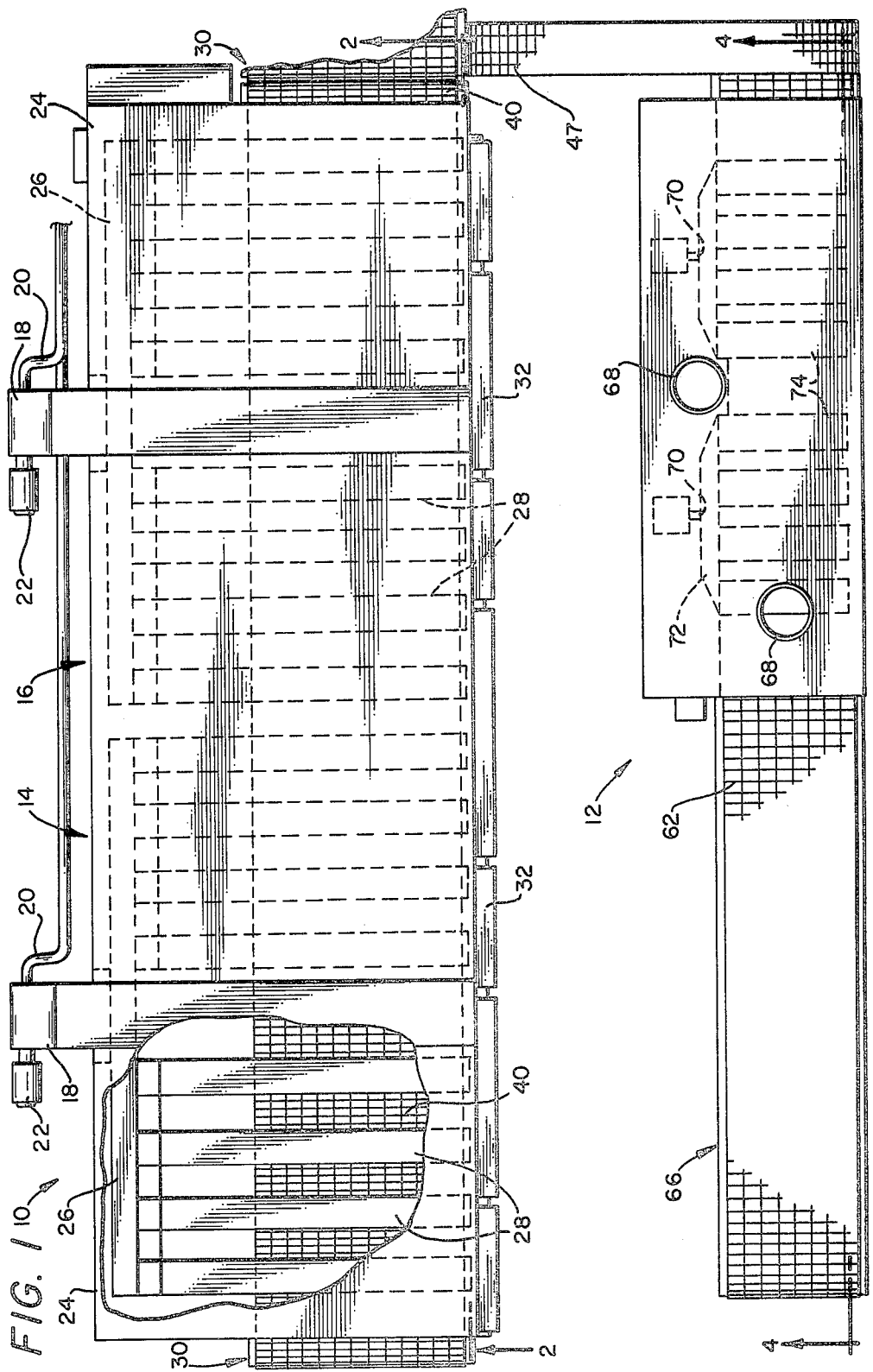
FIG. 1 depicts a partially cut away plan view of the apparatus of the invention.

Referring to FIG. 1, multiple-pass impingement oven 10 is shown in combination with impingement cooler 12. As shown in FIG. 1, impingement oven 10 comprises two side-by-side, substantially identical heating sections 14, 16. It is understood, however, that the apparatus of the present invention can comprise only one heating or cooling section, or two or more heating or cooling sections, so long as each such section comprises at least two thermal treatment zones as set forth below.

Each of heating sections 14, 16 further comprises a burner 18 to which fuel is supplied through line 20. As shown in FIG. 1, burner 18 is of a forced-air design in which outside air is forced through burner 18 by fan 22 into cabinet 24 surrounding heating sections 14, 16, although it is understood that other similarly effective temperature control means can also be used. Each of heating sections 14, 16 further comprises a plenum 26 that is in fluid communication with a plurality of ducts 28. Conveyor 30 is preferably made of wire mesh, and is adapted to transport food products through the respective heating sections of impingement oven 10. The design and construction of burner 18, cabinet 24 and conveyor 30 are more completely described in the specifications of my aforementioned copending patent applications which are incorporated herein by reference. Doors 32 are shown on the front of cabinet 24 to permit access to or inspection of food products being transported through impingement oven 10 by conveyor 30.

Figure 2:
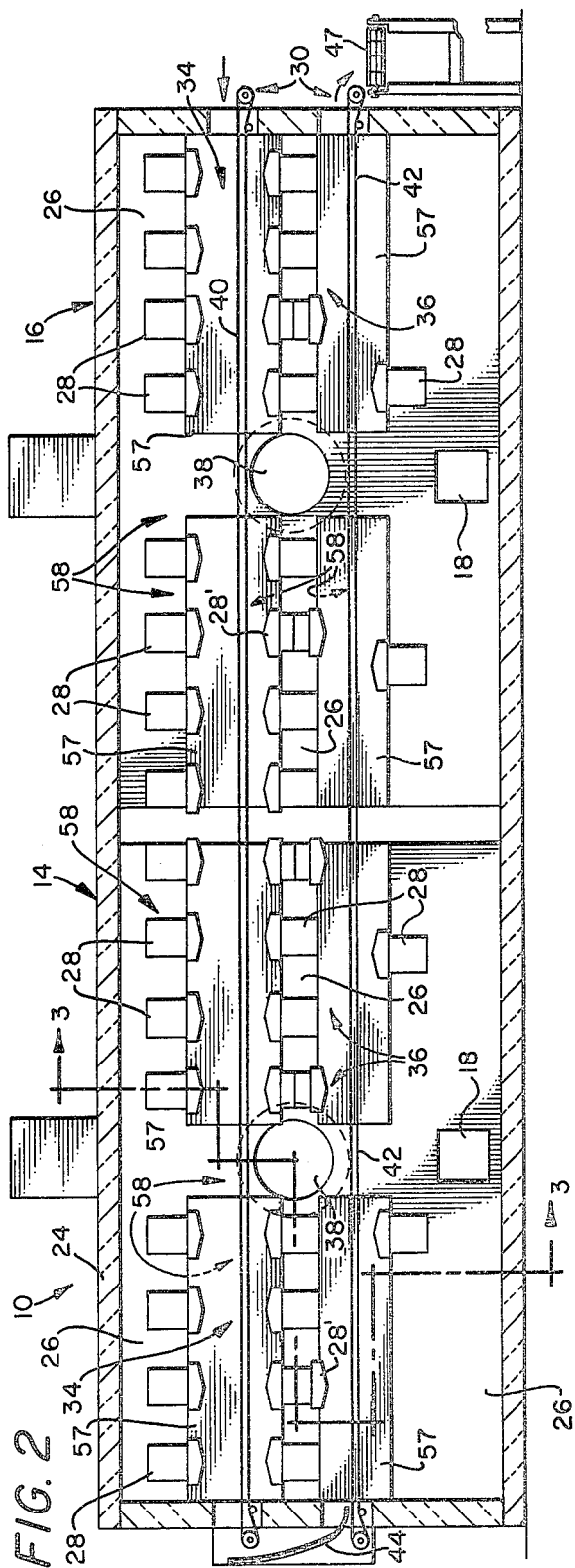
FIG. 2 depicts a sectional front elevation view of a preferred thermal treatment apparatus as viewed along line 2—2 of FIG. 1 comprising upper and lower thermal treatment zones wherein a temperature-controlled gas is delivered by a common plenum to a plurality of ducts adapted to direct columnated jets of the temperature-controlled gas so as to impinge against the upper and lower surfaces of a food product that is sequentially transported by a multiple-pass conveyor means through both the upper and lower zones.

The construction and operation of impingement oven 10 of FIG. 1 is further described in relation to FIG. 2, which depicts a sectional front elevation view along line 2—2 of FIG. 1. In FIG. 2, each of heating sections 14, 16 comprises a plenum 26 adapted to deliver a temperature-controlled gas to a plurality of ducts 28. Ducts 28 are disposed so as to define upper thermal treatment zone 34 and lower thermal treatment zone 36. The temperature-controlled gas is forced through plenum 26 into ducts 28 by an impeller means (see FIG. 3) disposed behind impeller intake port 38 of plenum 26. For taller or wider plenums, it may be desirable to use two or more impeller means within a single plenum. Columnated jets of the temperature-controlled gas are thereafter directed against the upper and lower surfaces of a food product as it is transported through upper thermal treatment zone 34 and lower thermal treatment zone 36 by conveyor 30.

According to the embodiment shown in FIG. 2, conveyor 30 further comprises upper conveyor section 40 for transporting a food product through upper thermal treatment zone 34, and lower conveyor section 42 for subsequently transporting the food product through lower thermal treatment zone 36. Conveyor 30 further comprises deflector panel 44. Food products emerging from upper thermal treatment zone 34 are discharged from upper conveyor section 40 and are directed by deflector panel 44 onto lower conveyor section 42. Lower conveyor section 42 transports the food products through lower thermal treatment zone 36 in a direction of travel opposite to that of upper conveyor section 40. After passing through the lower thermal treatment zones 36 of heating sections 14 and 16, the food products are discharged onto transfer conveyor 47 and are transported to impingement cooler 12, which is further discussed in relation to FIGS. 1 and 4.

While food products are being transported through upper thermal treatment zone 34 and lower thermal treatment zone 36, their upper and lower surfaces are subjected to impinging columnated jets of a temperature-controlled gas discharged from ducts 28. The rate at which thermal energy is transferred to the food products is dependent, among other factors, on the flow rate of gas through ducts 28, the temperature of the gas, and the speed of upper conveyor section 40 and lower conveyor section 42. For the configuration of ducts 28 shown in FIG. 2, and assuming that upper conveyor section 40 and lower conveyor section 42 are moving at the same speed, the rate of thermal energy transfer in upper thermal treatment zone 34 is greater than for lower thermal treatment zone 36. As shown, upper thermal treatment zone 34 of each of heating sections 14, 16 comprises eight downwardly directed ducts 28 and eight upwardly directed ducts 28. Lower thermal treatment zone 36 of heating section 14, on the other hand, is shown as having only three downwardly directed and two upwardly directed ducts 20, 28'. It is understood, of course, that the number and placement of ducts can vary according to the intended use within the scope of the invention. Ducts 28' are specially adapted to direct the flow of the temperature-controlled gas in both an upward and downward direction.

As used herein, the term "thermal energy transfer rate" means the rate at which thermal energy is either imparted to or removed from a food product by the columnated jets of gas impinging thereon. This rate is related to the volume and temperature of the gas that is directed against the food product as it passes through the thermal treatment zones. The volume of gas which contacts the food product is in turn affected by the number, design and relative positioning of ducts 28, 28', and the length and speed of travel along the different sections of conveyor 30.

Although the preceding discussion has been couched in terms of an impingement oven or heating apparatus, it will be understood and appreciated upon reading this disclosure that the subject apparatus is similarly applicable to use in a cooling or freezing application. When used for heating, the thermal energy transfer rate can be increased by increasing the temperature of the gas relative to the temperature of the food product. When used for cooling, the thermal energy transfer rate can be increased by decreasing the temperature of the gas relative to the temperature of the food product.

Figure 3:
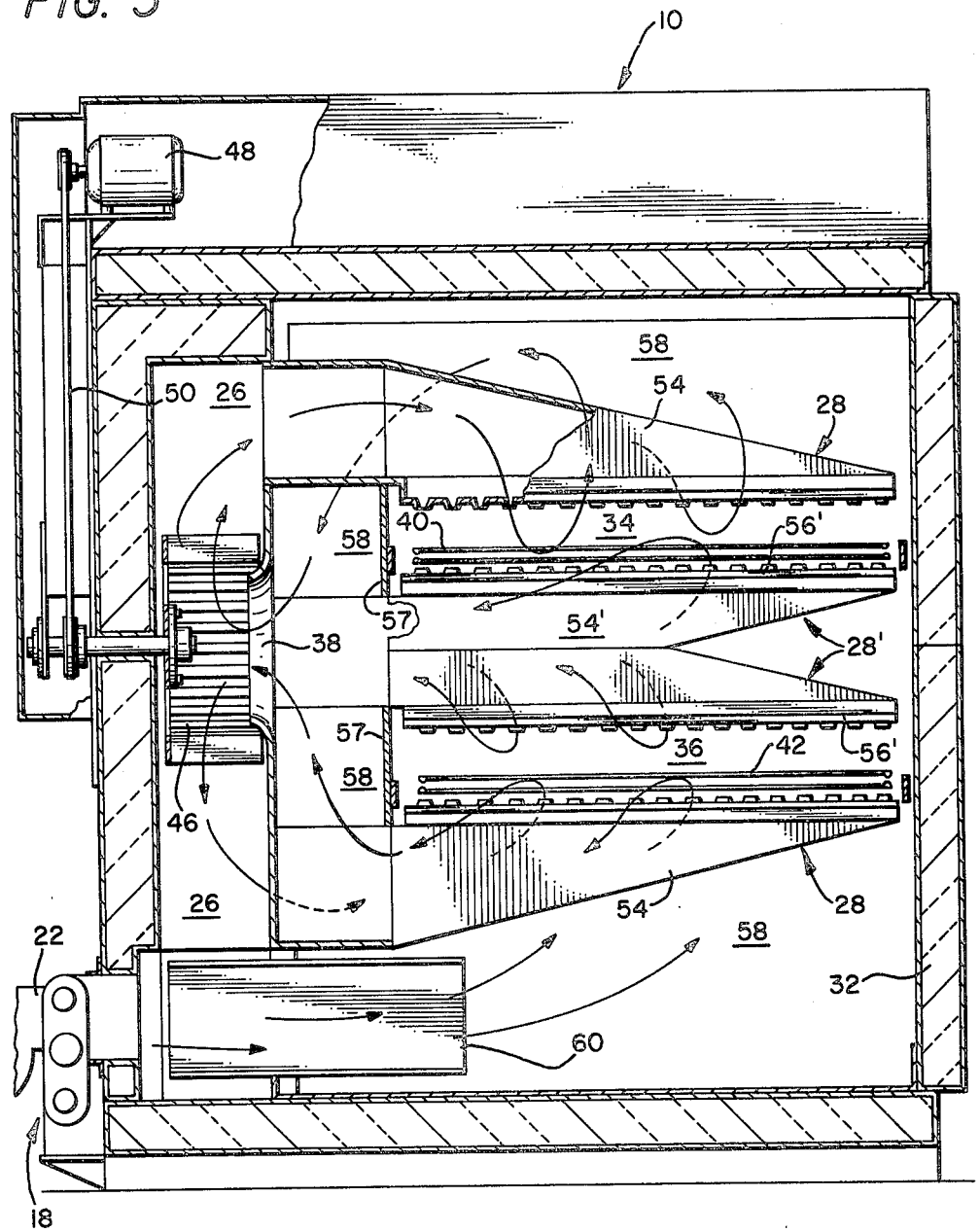
FIG. 3 is a sectional side elevation view of the apparatus of the invention as viewed along line 3—3 of FIG. 2.

The flow of the temperature-controlled gas through plenum 26 in ducts 28, 28' of impingement oven 10 is better understood when described in relation to the sectional side elevation view of FIG. 3. FIG. 3 again depicts cabinet 24 having burner 18, plenum 26 and ducts 28, 28' disposed therein. Impeller means 46 disposed behind impeller intake port 38 of plenum 26 is shown as being driven by motor 48 coupled by belt 50 to drive pulley 52. During operation, a food product is transported into upper thermal treatment zone 34 on upper conveyor section 40 in such manner that it passes beneath ducts 20, 28'. A temperature-controlled gas, preferably air, is discharged radially outward by impeller means 46 through plenum 26, which is in fluid communication with the interior of ducts 28, 28'.

The design and construction of ducts 28 are more completely detailed in my aforementioned copending patent applications which are incorporated by reference herein. Briefly, however, ducts 28 further comprise tapered portions 54 which receive the temperature controlled gas from plenum 26 and direct such gas through a plurality of columnating orifices in orifice plate 56. For ducts 28', the tapered portions 54' are specially adapted by means of their bifurcated design to promote even flow of the temperature-controlled gas across upper and lower orifice plates 56'. As shown in FIGS. 2 and 3, the major portion of the temperature-controlled gas discharged through orifice plates 56, 56' is drawn by the suction of impeller means 46 around baffles 57 and ducts 28, 28', returning along return channels 58 toward impeller intake port 38 in plenum 26 to be recirculated by impeller means 46. Additionally, heated gas is discharged into cabinet 24 through burner exhaust port 60, where it becomes intermixed with the gas being recirculated by impeller means 46. The temperature of the gas being discharged through orifice plates 56, 56' of ducts 28, 28' can be satisfactorily controlled by controlling the volume and temperature of gas introduced into cabinet 24 through burner exhaust port 60. A preferred gas for use in the present invention is air, which may be heated by a gas burner, electric resistance heater, or other means.

Once the food product has traversed the length of upper conveyor section 40, it is directed by deflector panel 44 as shown in FIG. 2 onto lower conveyor section 42 moving in a direction of travel opposite to that of upper conveyor section 40. The food product is thereafter transported between ducts 28, 28' defining lower thermal treatment zone 36.

The apparatus described in relation to FIGS. 1-3 has proven particularly effective for use in making toasted bakery products. When used in this manner, the food products to be toasted are first subjected to relatively intensive surface heating as they are transported by upper conveyor section 40 through upper thermal treatment zone 34. This intensive impingement surface heating effectively crisps and toasts the outer surface of the bakery products in the desired manner. The products are thereafter transported back through lower thermal treatment zone 36 on lower conveyor section 42, which can be controlled to travel at a different rate of speed than upper conveyor section 40 if desired. Because of the fluid communication that is permitted by the spacing between ducts 28, 28' disposed between upper conveyor section 40 and lower conveyor section 42, the temperature in upper and lower thermal treatment zones 34, 36 is substantially the same. By returning the food products through lower thermal treatment zone 36, in which they are maintained at the same temperature but subjected to a reduced amount of impingement heating, it is possible to further heat and dry the interior portions of the food product without overcooking the upper and lower surfaces. This configuration has been demonstrated to be particularly effective for use with toasted bakery products having a glazed or sugary coating.

Figure 4:
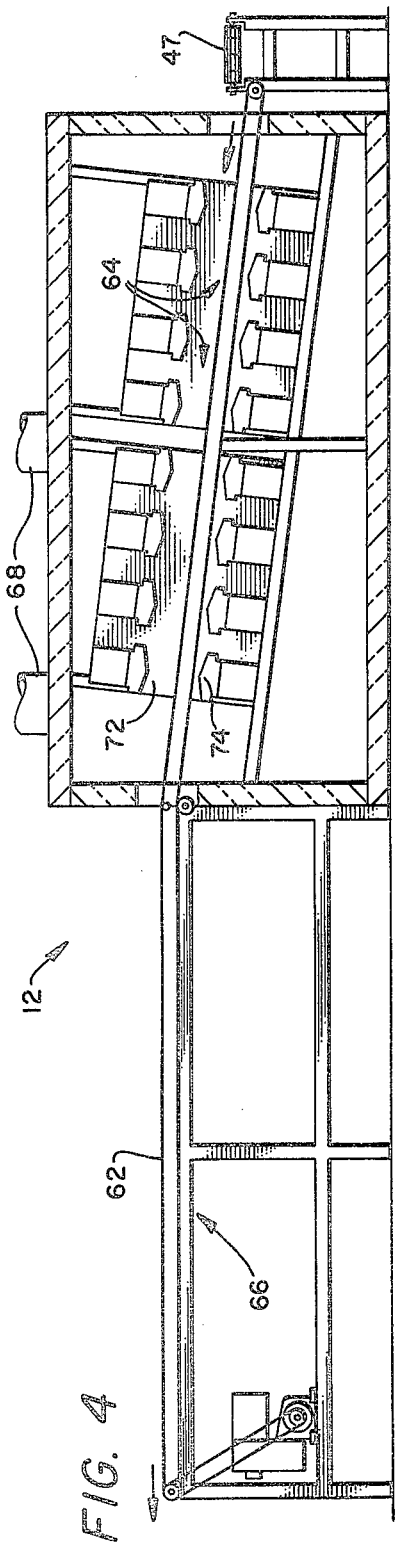
FIG. 4 is a sectional front elevation view of an auxiliary cooling section suitable for use with the apparatus of the invention, as viewed along line 4—4 of FIG. 1.

Referring to FIGS. 1 and 4, impingement cooler 12 is desirably employed in combination with impingement oven 10 in order to cool the food product prior to wrapping and storage. In the embodiment shown, the food product is discharged from transfer conveyor 47 onto cooling conveyor 62 and is thereafter transported through cooling zone 64 in impingement cooler 12 onto cooling rack 66 to await wrapping and storage. In impingement cooler 12, ambient air is received through intake pipes 68 and is forced by an impeller (not shown) through cooling plenum intakes 70 into cooling plenum 72. Cooling plenum 72 is in fluid communication with a plurality of cooling ducts 74 from which columnated jets of the relatively cooler ambient air are directed against the upper and lower surfaces of the food product.

Although the apparatus of the invention has been described herein in relation to a preferred embodiment for use in toasting bakery goods, it is understood that various alterations and modifications of the invention will become apparent to those of ordinary skill in the art upon reading the present disclosure, and it is intended that the scope of the invention be limited only by the appended claims.

What is claimed is:

1. Apparatus for thermally treating food products, said apparatus comprising: a cabinet; conveyor means for transporting food products through said cabinet; impeller means disposed within said cabinet for circulating a temperature-controlled gas within said cabinet; plenum means disposed within said cabinet for receiving the temperature-controlled gas circulated within said cabinet from said impeller means; delivery means disposed within said cabinet in fluid communication with said plenum means for delivering said temperature-controlled gas from said plenum means to at least two thermal treatment zones disposed around said conveyor means, said delivery means further comprising a plurality of longitudinally spaced jet fingers extending transversely to said conveyor means, said jet fingers being adapted to direct columnated jets of said temperature-controlled gas so as to impinge on at least one surface of food products conveyed through said zones, said plenum means and said delivery means being further adapted to subject said food products conveyed therethrough to different thermal energy transfer rates in at least two of said zones.

2. The apparatus of claim 1 wherein said delivery means is adapted to direct columnated jets of said temperature-controlled gas so as to impinge on both the upper and lower surfaces of food products conveyed through said zones.

3. The apparatus of claim 1 wherein said delivery means is a bifurcated duct.

4. The apparatus of claim 1 wherein said thermal treatment zones comprise at least one upper thermal treatment zone and at least one lower thermal treatment zone.

5. The apparatus of claim 1 wherein said delivery means is adapted to direct a different number of columnated jets of temperature-controlled gas against the surface of the food products in the first thermal treatment zone than in a subsequent thermal treatment zone.

6. The apparatus of claim 1 wherein said delivery means is adapted to permit recirculation of said temperature-controlled gas through said delivery means.

* * * * *